Figure 3:
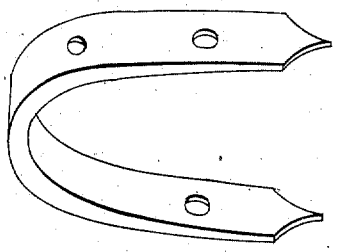
Figure 2:
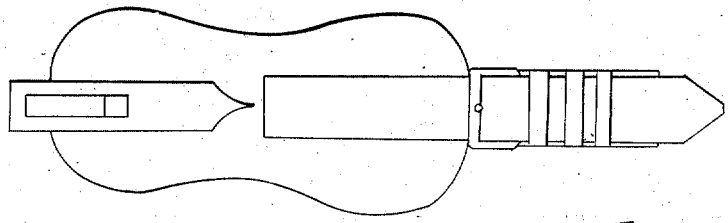
Figure 1:
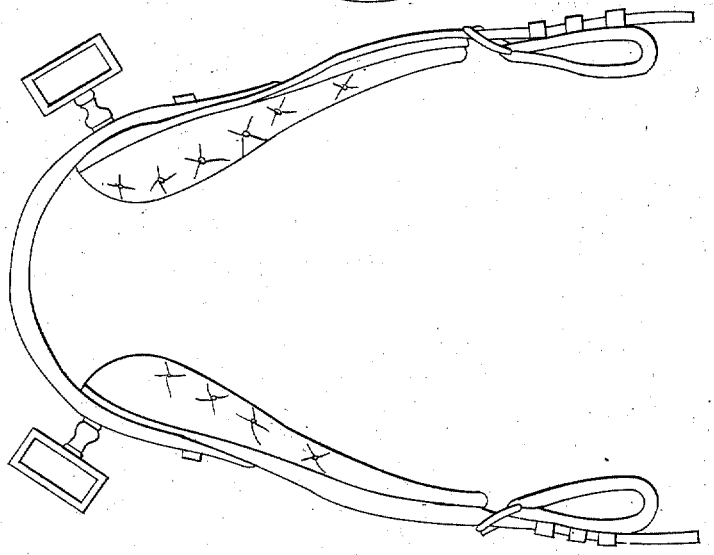

7362X

S. Lamson,
Harness Pad.

Patented Jan. 5, 1833.

A. PETERS, PHOTO-LITHOGRAPHER, WASHINGTON, D. C.

7362X

Silas Lamson. of Sterling State of Massachusetts

Letters Patent.

The Schedule referred to in these Letters Patent and making part
of the same containing a description in the words of the said
Silas Lamson himself of his improvement in the mode of making
pads for harnesses, called the "Pad Brace or Stiffener"

To all persons to whom these presents shall come
Silas Lamson of Sterling in the County of Worcester & State
of Massachusetts, yeoman sends greeting, — Be it known
that I the said Silas, have invented, constructed, made and
applied to use a new and useful improvement in the mode
of making pads for harnesses & other tackling for horses, called
the Pad brace or Stiffener specified in the words following.
to wit, — This improvement consists of a rod of iron
in a semicircular or crescent form perforated at each end
and long enough to pass from one tenet to the other in a com-
mon leather pad, such as is used in a wagon or carriage
harness — The design and object of which is to raise
the centre of the trace from the back and withers of the
horse, and to through the weight upon each side of the back, so
as to prevent galling and injuring the ridge or back of the
horse, — The rod I have invented is made fast to the
pad by passing the tenets thro' each end and when it is
inserted the pad cannot spread so as to let the upper part
down, upon the back of the horse, — The rod rises above the
back & being above the leather in a curve so high, that it can
never do injury by touching it — When the pad is on the
Horse the rod of course passes from one tenet to the other
over the back and being stiff & strong enough to bear what
-ever weight is appended to the pad without spreading it
keeps the pad firmly in its place lifting the highest part 7362x Jan 5, 1833 entirely from the back, or letting it rest so lightly as to do no hurt or dispensing with that connecting part of the leather entirely and leaving the upper ridge of the back naked. The form of such a rod may evidently be varied to suit the taste of the maker & so may the fastening to the pad.

I have described the above as a simple & cheap way & therefore probably the most useful. It is also evident that other material may be used in the construction of the rod besides iron; The above invention enables him who has occasion for it to use a small light pad neither cumbersome or dangerous to the horse and saves the animal from suffering by a galled back & withers In testimony of all which, as a true specification of my said improvement, I have hereto set my hand this fifth day of November A.D. 1832.

Witnesses
John Davis
John C B. Davis

Silas Lamson

L.G.W.

528 [illegible]

( [illegible] 5. [illegible] 32 )